United States Patent
Kwak et al.

(10) Patent No.: US 8,204,449 B2
(45) Date of Patent: Jun. 19, 2012

(54) METHOD AND APPARATUS FOR SIGNALING USER EQUIPMENT STATUS INFORMATION FOR UPLINK PACKET TRANSMISSION IN A SOFT HANDOVER REGION

(75) Inventors: Yong-Jun Kwak, Yongin-si (KR); Ju-Ho Lee, Suwon-si (KR); Kook-Heui Lee, Yongin-si (KR); Joon-Young Cho, Suwon-si (KR); Youn-Hyoung Heo, Suwon-si (KR); Young-Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 12/654,288

(22) Filed: Dec. 16, 2009

(65) Prior Publication Data

US 2010/0103899 A1 Apr. 29, 2010

Related U.S. Application Data

(63) Continuation of application No. 11/196,481, filed on Aug. 4, 2005, now Pat. No. 7,769,351.

(30) Foreign Application Priority Data

Aug. 7, 2004 (KR) .................. 2004-62265
Nov. 11, 2004 (KR) .................. 2004-92154

(51) Int. Cl.
*H04B 1/00* (2006.01)
*H04B 7/00* (2006.01)
(52) U.S. Cl. ............ 455/69; 455/68; 455/436; 455/437; 370/331; 370/335; 370/338
(58) Field of Classification Search .......... 455/436–445, 455/522, 68–69, 458, 67.11; 370/328–338
See application file for complete search history.

(56) References Cited

U.S. PATENT DOCUMENTS 6,542,718 B1 * 4/2003 Kuo et al. .................. 455/69
(Continued)

FOREIGN PATENT DOCUMENTS

EP 1494371 1/2005
(Continued)

OTHER PUBLICATIONS

Anonymous, "3$^{rd}$ Generation Partnership Project; Technical Specification Group Radio Access Network; Feasibility Study for Enhanced Uplink for UTRA FDD (Release 6)", Mar. 2004, pp. 28-29.

(Continued)

*Primary Examiner* — Tuan A Tran
(74) *Attorney, Agent, or Firm* — Roylance, Abrams, Berdo & Goodman, LLP

(57) ABSTRACT

A method and apparatus are provided for transmitting user equipment (UE) status information in communication with one serving Node B and at least one non-serving Node B in a mobile communication system. The method and apparatus comprise generating transport channel data including UE status information; transmitting the transport channel data to the serving Node B and the at least one non-serving Node B, receiving a response signal for the transport channel data from the serving Node B, and retransmitting the transport channel data if the response signal received from the serving Node B is a non-acknowledge (NACK) signal, and ending the retransmission of the transport channel data if the response signal received from the serving Node B is an acknowledge (ACK) signal.

16 Claims, 12 Drawing Sheets

U.S. PATENT DOCUMENTS

| | | | |
|---|---|---|---|
| 6,563,810 B1* | 5/2003 | Corazza | 370/335 |
| 7,050,397 B2* | 5/2006 | Cheng et al. | 370/235 |
| 7,149,192 B2* | 12/2006 | Kwak | 370/320 |
| 7,158,796 B2* | 1/2007 | Tiedemann et al. | 455/453 |
| 7,197,319 B2* | 3/2007 | Tiedemann et al. | 455/453 |
| 7,197,692 B2* | 3/2007 | Sutivong et al. | 714/796 |
| 7,388,852 B2* | 6/2008 | Zhang et al. | 370/335 |
| 7,480,267 B2* | 1/2009 | Funnell et al. | 370/328 |
| 7,672,265 B2* | 3/2010 | Kwak | 370/320 |
| 7,746,841 B2* | 6/2010 | Meiling et al. | 370/349 |
| 2002/0191544 A1 | 12/2002 | Cheng et al. | |
| 2003/0152031 A1* | 8/2003 | Toskala et al. | 370/236 |
| 2003/0187570 A1 | 10/2003 | Impson et al. | |
| 2004/0088641 A1* | 5/2004 | Torsner et al. | 714/776 |

FOREIGN PATENT DOCUMENTS

| | | |
|---|---|---|
| RU | 2175466 | 7/2000 |
| WO | WO 2004/019519 | 4/2004 |
| WO | WO 2005/109753 | 11/2005 |

OTHER PUBLICATIONS

Anonymous, "HS-DPCCH Power Control in Soft-Handoff", TSG-RAN1#26, May 13, 2002, Gyeong, Korea, XP002229771, pp. 1-12.

Ghosh et al., "Overview of Enhanced Uplink for 3GPP W-CDMA", Vehicular Technology Conference, Spring 2004, IEEE, Milan, Italy, May 17, 2004 and Piscataway, NJ, USA, May 17, 2004, ISBN 0-7803-8255-2/04, pp. 2261-2265.

Anonymous, "HARQ Principles (SHO Operation)", R1-040948, TSG-RAN Working Group 1, Prague, Czech Republic, Aug. 16-20, 2004.

Anonymous, "HARQ Aspects of E-DCH", R1-040540, 3GPP TSG-RAN WG1 #37, Montreal, Canada, May 10-14, 2004.

* cited by examiner

METHOD AND APPARATUS FOR SIGNALING USER EQUIPMENT STATUS INFORMATION FOR UPLINK PACKET TRANSMISSION IN A SOFT HANDOVER REGION

PRIORITY

This application is a continuation of U.S. patent application Ser. No. 11/196,481, filed on Aug. 4, 2005, now U.S. Pat. No. 7,769,351, which in turns claims the benefit under 35 U.S.C. §119(a) of an application filed in the Korean Intellectual Property Office on Aug. 7, 2004 and assigned Serial No. 2004-62265, and an application filed in the Korean Intellectual Property Office on Nov. 11, 2004 and assigned Serial No. 2004-92154, the entire contents of both of which are incorporated herein by reference.

BACKGROUND OF THE INVENTION

1. Field of the Invention

The present invention relates generally to asynchronous Wideband Code Division Multiple Access (WCDMA) communication. In particular, the present invention relates to a method and apparatus for signaling user equipment (UE) status information for uplink packet transmission in a soft handover region.

2. Description of the Related Art

A Universal Mobile Telecommunications Service (UMTS) system which is a $3^{rd}$ generation mobile communication system that is based on Global System for Mobile Communications system (GSM) which is a European mobile communication system and uses Wideband Code Division Multiple Access (WCDMA), provides a consistent service capable of transmitting packet-based text, digitalized audio or video, and multimedia data at a high rate of 2 Mbps or higher no matter where mobile phone users or computer users are located. UMTS uses the concept of virtual access called "packet-switched access" that uses a packet protocol like Internet Protocol (IP) to access any terminal in the network.

FIG. 1 is a diagram illustrating a configuration of a conventional UMTS Terrestrial Radio Access Network (UTRAN). Referring to FIG. 1, a UTRAN 12 includes radio network controllers (RNCs) 16a and 16b, and Node Bs 18a, 18b, 18c and 18d, and connects a user equipment (UE) 20 to a core network 10. Each of the Node Bs 18a, 18b, 18c and 18d can have a plurality of cells in its lower layer. The RNCs 16a and 16b each control their associated Node Bs 18a, 18b, 18c and 18d in their lower layers. For example, in FIG. 1, the RNC 16a controls the Node Bs 18a and 18b, and the RNC 16b controls the Node Bs 18c and 18d. The Node Bs 18a, 18b, 18c and 18d each control their associated cells. One RNC and its associated Node Bs and cells controlled by the RNC constitute a radio network subsystem (RNS) 14a or 14b.

Each of the RNCs 16a and 16b assigns or manages radio resources of its Node Bs 18a to 18d, and each of the Node Bs 18a to 18d provides the radio resources. The radio resources are generated per cell, and the radio resources provided by the Node Bs 18a to 18d refers to radio resources of cells managed by the Node Bs themselves. The UE 20 can create a radio channel using a radio resource provided by a particular cell of a particular Node B, and perform communication using the created radio channel. Because distinguishing between Node Bs 18a to 18d and their associated cells is meaningless to the UE 20 and the UE 20 recognizes only the physical layers created per cell, the terms "Node Bs 18a to 18d" and "cells" will be used herein interchangeably.

An interface between the UE 20 and RNCs 16a and 16b is called a Uu interface, and its detailed hierarchical structure is illustrated in FIG. 2.

FIG. 2 is a diagram illustrating a hierarchical structure representing an interface between a UE and an RNC. The Uu interface is divided into a control plane 30 used for control signal exchange between the UE 20 and the RNCs 16a and 16b and a user plane 32 used for actual data transmission.

Referring to FIG. 2, the control-plane (C-plane) 30 has a radio resource control (RRC) layer 34, a radio link control (RLC) layer 40, a media access control (MAC) layer 42, and a physical (PHY) layer 44, and the user-plane (U-plane) 32 has a packet data control protocol (PDCP) layer 36, a broadcast/multicast control (BMC) layer 38, the RLC layer 40, the MAC layer 42 and the PHY layer 44. Among the layers illustrated herein, the PHY layer 44 is located in each cell and the MAC layer 42 through the RRC layer 34 can be located in a RNC.

The PHY layer 44 provides an information transfer service using a radio transfer technique, and corresponds to Layer 1 (L1) of the Opening Systems Interconnection (OSI) model. Connection between the PHY layer 44 and the MAC layer 42 is achieved by transport channels, and the transport channels are defined according to how specific data is processed in the PHY layer 44.

The MAC layer 42 is connected to the RLC layer 40 through logical channels. The MAC layer 42 delivers data received through a logical channel from the RLC layer 40 to the PHY layer 44 through a proper transport channel, and delivers data received through a transport channel from the PHY layer 44 to the RLC layer 40 through a proper logical channel. In addition, the MAC layer 42 inserts additional information into data received through a logical channel or a transport channel, or analyzes additional information inserted into data and performs an appropriate operation according to the analyzed additional information. Further, the MAC layer 42 controls a random access operation. In the MAC layer 42, a part related to the user plane 30 is called MAC-d, and a part related to the control plane 32 is called MAC-c.

The RLC layer 40 manages setup and release of a logical channel. The RLC layer 40 can operate in one of three operation modes comprising an acknowledged mode (AM), an unacknowledged mode (UM) and a transparent mode (TM), and each operation mode provides a different function. Generally, the RLC layer 40 has a function of disassembling or assembling a service data unit (SDU) provided from an upper layer in an appropriate size, and an error correction function.

The PDCP layer 36 is located in an upper layer of the RLC layer 40 in the user plane 32, and has a function of compressing and decompressing a header of data transmitted in the form of an IP packet and a function of losslessly-transmitting data in a situation where a RNC providing a mobile service to a particular UE is changed.

A characteristic of the transport channels connecting the PHY layer 44 to its upper layers is determined by a transport format (TF) that defines physical layer processing processes, such as convolutional channel encoding, interleaving and service-specific rate matching.

A UMTS system uses an enhanced uplink dedicated channel (E-DCH) so as to enhance packet transmission performance in uplink communication from a UE to a Node B. In order to support stabilized high-speed data transmission, the E-DCH supports such techniques as Hybrid Automatic Retransmission Request (HARM) and Node B-controlled scheduling. In the MAC layer, a part managing processing of the E-DCH is called MAC-e.

FIG. 3 is a diagram illustrating a conventional method of transmitting data over an E-DCH in a radio uplink. Referring to FIG. 3, reference numeral 100 represents a Node B supporting the E-DCH, and reference numerals 101, 102, 103 and 104 represent UEs transmitting the E-DCH. The Node B 100 analyzes channel conditions of the UEs 101 through 104 that use the E-DCH, and schedules data rates of the UEs 101 through 104 according to the analysis result. In order to increase the entire system performance, the scheduling is performed in such a manner that UEs (e.g., UEs 103 and 104) located farther from the Node B 100 is assigned a lower data rate and UEs (e.g., UEs 101 and 102) located nearer to the Node B 100 is assigned a higher data rate as long as a measured Rise-over-Thermal (RoT) value of the Node B 100 does not exceed a target RoT value.

FIG. 4 is a signaling diagram illustrating a conventional procedure for transmitting and receiving messages over an E-DCH. Referring to FIG. 4, in step 202, a Node B and a UE set up an E-DCH therebetween. The E-DCH setup process 202 includes a process of transmitting messages through a dedicated transport channel. After the E-DCH setup, the UE provides UE status information to the Node B in step 204. The UE status information can include UE's transmission power information representing uplink channel information, information on available extra power of the UE, and the amount of transmission data piled in a UE's buffer.

In step 206, the Node B, which receives scheduling information from a plurality of UEs in communication with the Node B, monitors UE status information received from the plurality of UEs in order to schedule a data rate of each UE. In step 208, the Node B determines to grant the UE to transmit an uplink packet and transmits scheduling assignment information to the UE. The scheduling assignment information includes a granted maximum data rate and granted transmission timing.

In step 210, the UE determines a transport format (TF) of the E-DCH to be transmitted in a reverse direction, using the scheduling assignment information. The UE transmits uplink (UL) packet data over the E-DCH in step 212, and at the same time, transmits the TF information, i.e., a transport format resource indicator (TFRI), to the Node B in step 214. In step 216, the Node B determines whether there is an error in the TF information and the packet data. In step 218, the Node B transmits a non-acknowledge (NACK) to the UE over an ACK/NACK channel if there is an error in any of them. However, if there is no error in both of them, the Node B transmits an acknowledge (ACK) to the UE through the ACK/NACK channel.

If the ACK is transmitted indicating the completed transmission of the corresponding packet data, the UE transmits new data through the E-DCH. However, if the NACK is transmitted indicating the transmission error of the corresponding packet data, the UE retransmits the same packet data over the E-DCH.

The E-DCH, as it is an upgraded dedicated channel (DCH) for packet transmission of the transport channel, has the basic characteristics of the dedicated channel, and one of the characteristics is to support soft handover. When the soft handover is supported, a UE located in a soft handover region can set up E-DCHs to all of Node Bs included in its active set.

FIG. 5 is a diagram illustrating a conventional operation for supporting soft handover for an E-DCH. Referring to FIG. 5, a UE 504 includes Node Bs 501, 502 and 503 in its active set. In uplink power control, the UE 504 creates one combined transmit power control command (TPC) by combining a TPC#1 506 transmitted from the Node B#1 501, a TPC#2 507 transmitted from the Node B#2 502, and a TPC#3 508 transmitted from the Node B#3 503, and determines transmission power for uplink transmission of E-DCH data 505 depending on the combined TPC. According to the conventional TPC combining method, the UE 504 decreases transmission power of the E-DCH 505 by a predetermined value if any one of the TPCs 506, 507 and 508 is a DOWN command, and increases the transmission power of the E-DCH 505 by a predetermined value if all of the TPCs 506, 507 and 508 are UP commands. This method is called an "OR-of-DOWN method."

The UE 504 in soft handover performs a HARQ operation in the following manner. The UE 504, after transmitting the E-DCH data 505, receives ACKs/NACKs 511, 512 and 513 from the Node Bs 501, 502 and 503, respectively. If any one of the ACKs/NACKs is an ACK signal, the UE 504 ends the HARQ operation, i.e., a retransmission operation, on the current E-DCH data 505. However, if all of the ACKs/NACKs 511, 512 and 513 are NACK signals, the UE 504 retransmits the same E-DCH data 505.

That is, if only the Node B#1 501 receive the E-DCH data 505 transmitted by the UE 504 without error and the other Node Bs 502 and 503 fail to normally receive the E-DCH data 505 transmitted by the UE 504, a RNC 510 to which the Node Bs 501, 502 and 503 are connected can correctly receive information included in the E-DCH data 505 transmitted by the UE 504. Therefore, if only one of the Node Bs 501, 502 and 503 included in the active set succeeds in receiving the E-DCH data 505, the HARQ retransmission is no longer required.

The UE located in the soft handover region simultaneously receives scheduling assignment information related to the E-DCH from several Node Bs included in the active set. Among the Node Bs included in the active set, a Node B having the best condition for scheduling the UE is selected as a best scheduling Node B (that is, serving Node B), and the other Node Bs are selected as non-best scheduling Node Bs (that is, non-serving Node Bs). Non-serving Node Bs refer to Node Bs that are included in the active set of the UE but have failed to be selected as the serving Node B. Compared with the non-serving Node Bs, the serving Node B has a higher authority in scheduling the UE located in the soft handover region. The UE determines a transport format (data rate, coding rate, etc.) of the E-DCH to be transmitted in the uplink direction by combining scheduling assignment information from the serving Node B with scheduling assignment information from the non-serving Node Bs.

While a scheduling method of the serving Node B is used at the same ratio as the method used for scheduling UEs located in a non-soft handover region, scheduling of the non-serving Node B is performed in a passive method for minimizing interference to other Node Bs included in the active set. That is, compared with the scheduling assignment information of the non-serving Node B, the scheduling assignment information of the serving Node B becomes a greater factor in determining an E-DCH by the UE.

However, the UE located in the soft handover region undergoes uplink transmission power control not only by the serving Node B but also by the non-serving Node B. Therefore, if the non-serving Node B is superior to the serving Node B in terms of uplink channel conditions, the UE may follow a TPC of the non-serving Node B. Because the transmission power of the UE is controlled based on the non-serving Node B, the UE status information can be received at the serving Node B at a very high error rate. In this case, the serving Node B can barely detect the UE status information. In the conventional E-DCH technology, the serving Node B, although it has a high authority, performs scheduling using incorrect UE status information, deteriorating scheduling performance.

SUMMARY OF THE INVENTION

Therefore, to address the above described problem, exemplary embodiments of the present invention provide signaling method and apparatus for user equipment (UE) status information for scheduling of enhanced uplink transport channels for UEs located in a soft handover region in an asynchronous Wide-band Code Division Multiple Access (WCDMA) communication system.

In addition, an exemplary aspect of the present invention provides a method and apparatus in which, when a UE located in a soft handover region transmits UE status information using media access control (MAC)-e signaling, a serving Node B can correctly receive the UE status information.

According to one exemplary aspect of the present invention, a method is provided for transmitting user equipment (UE) status information by a UE in communication with one serving Node B and at least one non-serving Node B in a mobile communication system supporting an uplink packet data service. The method comprises the steps of generating transport channel data comprising UE status information, transmitting the transport channel data to the serving Node B and the at least one non-serving Node B, receiving a response signal for the transport channel data from the serving Node B, retransmitting the transport channel data if the response signal received from the serving Node B is a non-acknowledge (NACK) signal, and ending the retransmission of the transport channel data if the response signal received from the serving Node B is an acknowledge (ACK) signal.

According to another exemplary aspect of the present invention, a method is provided for transmitting user equipment (UE) status information by a UE in communication with one serving Node B and at least one non-serving Node B in a mobile communication system supporting an uplink packet data service. The method comprises the steps of generating transport channel data comprising UE status information, transmitting the transport channel data to the serving Node B and the at least one non-serving Node B; receiving response signals for the transport channel data from the serving Node B and the at least one non-serving Node B, transmitting transport channel data comprising the UE status information and new packet data to the serving Node B and the at least one non-serving Node B if the response signal received from the serving Node B is a non-acknowledge (NACK) signal and the response signal received from the at least one non-serving Node B is an acknowledge (ACK) signal, and ending the transmission of the transport channel data if the response signal received from the serving Node B is an ACK signal.

According to further another exemplary aspect of the present invention, a user equipment (UE) apparatus is provided for transmitting UE status information to one serving Node B and at least one non-serving Node B in a mobile communication system supporting an uplink packet data service. The apparatus comprises a generator for generating transport channel data comprising UE status information, a transmitter for transmitting the transport channel data to the serving Node B and the at least one non-serving Node B, and a receiver for receiving a response signal for the transport channel data from the serving Node B. The transmitter selectively retransmits the UE status information according to the response signal received from the serving Node B without considering a response signal received from the at least one non-serving Node B if the transport channel data includes the UE status information.

According to yet another exemplary aspect of the present invention, a method is provided for transmitting uplink packet data by a user equipment (UE) in communication with one serving Node B and at least one non-serving Node B in a mobile communication system supporting an uplink packet data service. The method comprises the steps of generating first control channel data indicating a transport format of transport channel data having packet data for the uplink packet data service and second control channel data comprising UE status information, determining first transmission power for the first control channel data according to power control commands received from the serving Node B and the at least one non-serving Node B, setting a predetermined power offset value for the second control channel data, determining second transmission power for the second control channel data by adding the power offset value to the first transmission power, applying channel gains for the first transmission power and the second transmission power to the first control channel data and the second control channel data, and transmitting the channel gain-applied first control channel data and second control channel data after multiplexing.

According to still another exemplary aspect of the present invention, a user equipment (UE) apparatus is provided for transmitting uplink packet data to one serving Node B and at least one non-serving Node B in a mobile communication system supporting an uplink packet data service. The apparatus comprises a first control channel generator for generating first control channel data indicating a transport format of transport channel data having packet data for the uplink packet data service, a second control channel generator for generating second control channel data comprising UE status information, and a multiplexer for multiplying the first control channel data by a first power gain for first transmission power, multiplying the second control channel data by a second power gain for second transmission power, and transmitting the power gain-multiplied first control channel data and second control channel data after multiplexing. The second transmission power is determined by adding a predetermined power offset for the second control channel data to the first transmission power.

BRIEF DESCRIPTION OF THE DRAWINGS

The above and other exemplary objects, features and advantages of the present invention will become more apparent from the following detailed description of exemplary embodiments of the present invention when taken in conjunction with the accompanying drawings in which like reference symbols indicate the same or similar components, wherein.

Throughout the drawings, the same or similar elements are denoted by the same reference numerals.

DETAILED DESCRIPTION OF EXEMPLARY EMBODIMENTS

Several exemplary embodiments of the present invention will now be described in detail with reference to the accompanying drawings. In the following description, a detailed description of known functions and configurations incorporated herein has been omitted for conciseness.

The exemplary embodiments of the present invention provide a signaling method and apparatus in which a user equipment (UE) located in a soft handover region efficiently transmit UE status information to a serving Node B. When the UE located in a soft handover region transmits UE status information to Node Bs included in its active set by performing uplink transmission power control using an exemplary OR-of-DOWN method, the UE status information can be correctly transmitted to the serving Node B.

The UE status information comprises, for example, at least one of buffer status information indicating the amount of data stored in a buffer of the UE, uplink transmission power information indicating uplink channel conditions of the UE, and power margin information indicating available power for the UE. A method for transmitting the UE status information to a Node B is divided into a physical channel signaling method in which physical channels are used, and a MAC-e signaling method for comprising at least data and the UE status information in a MAC-e header or a payload of a packet data unit (PDU) generated in a MAC-e layer and transmitting it through an enhanced uplink dedicated channel (E-DCH).

Figure 1:
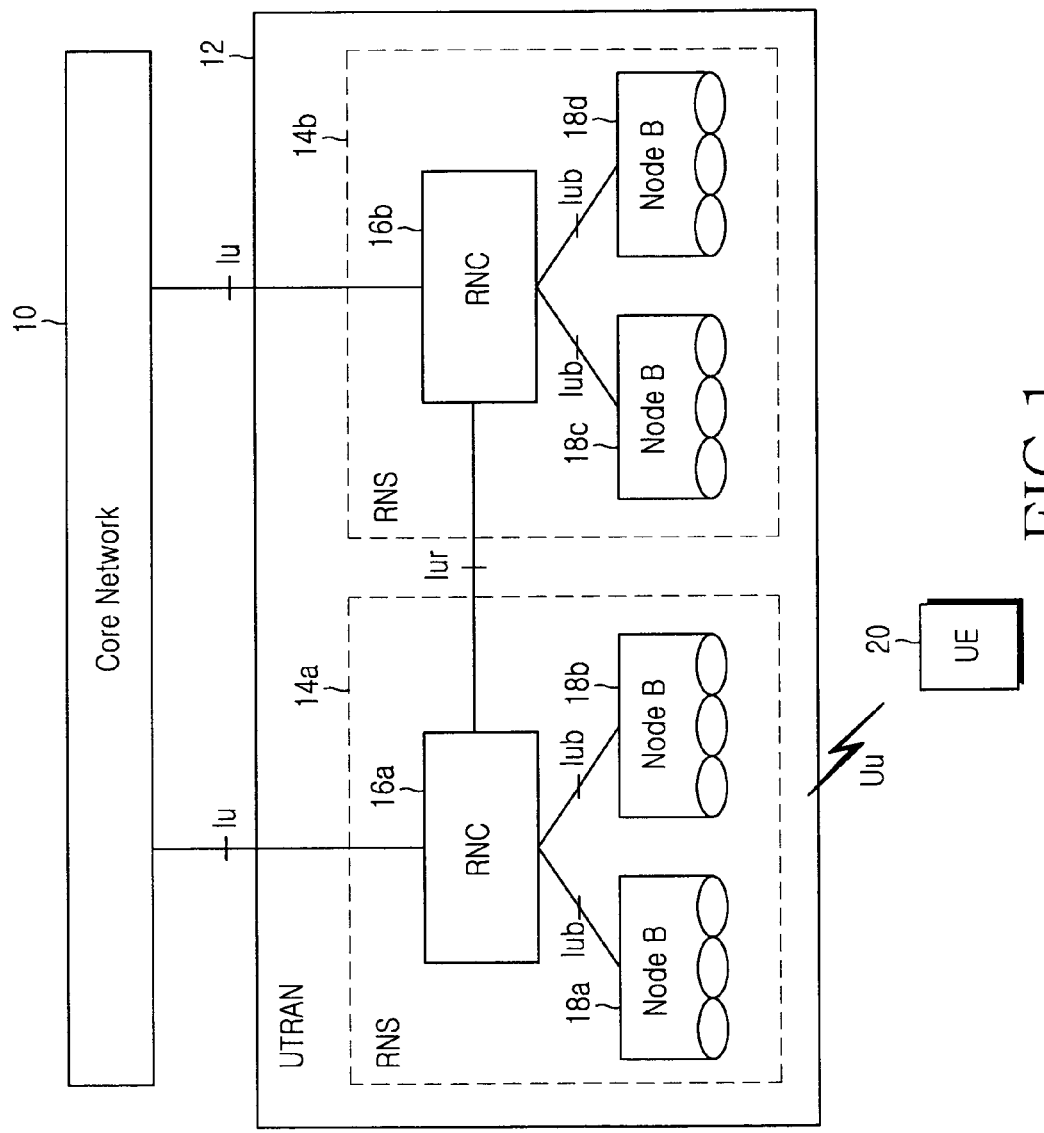
FIG. 1 is a diagram illustrating a conventional configuration of a UMTS Terrestrial Radio Access Network (UTRAN)
Figure 2:
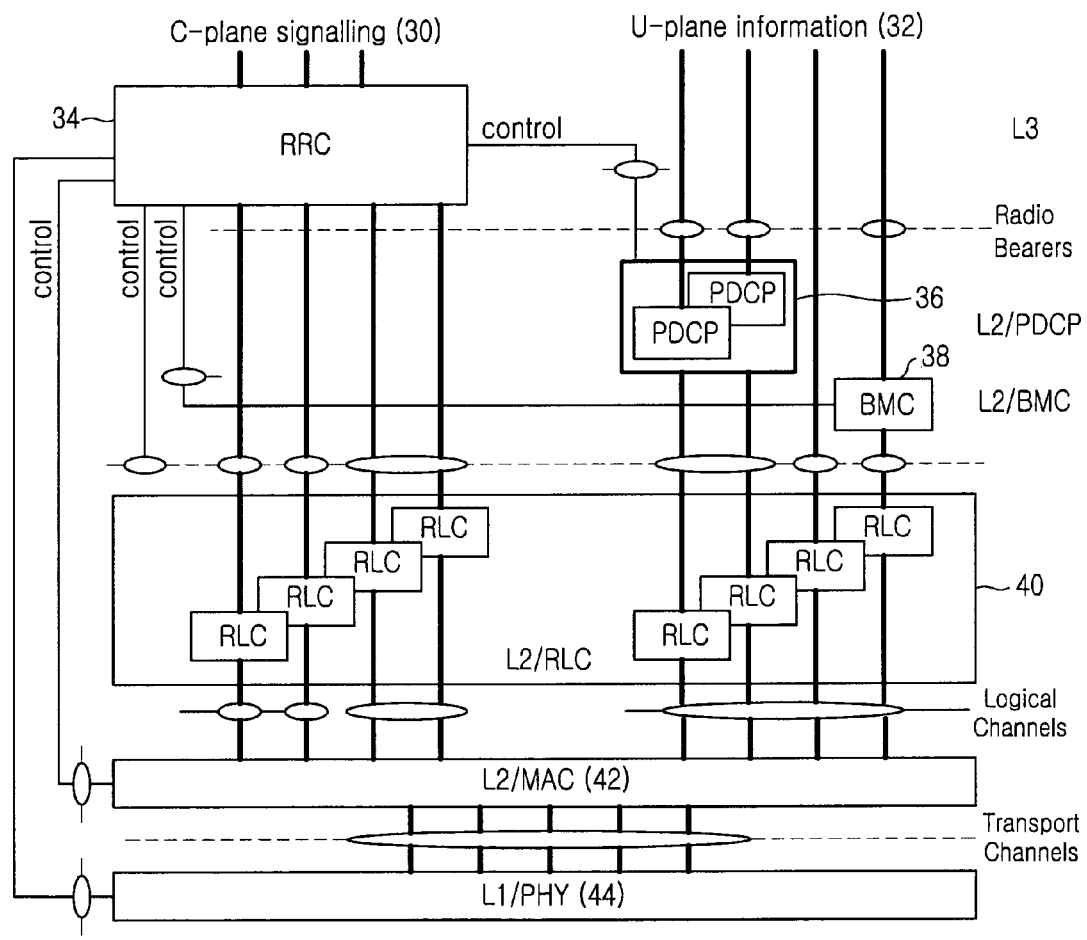
FIG. 2 is a diagram illustrating a hierarchical structure representing an interface between a user equipment (UE) and radio network controllers (RNC)
Figure 3:
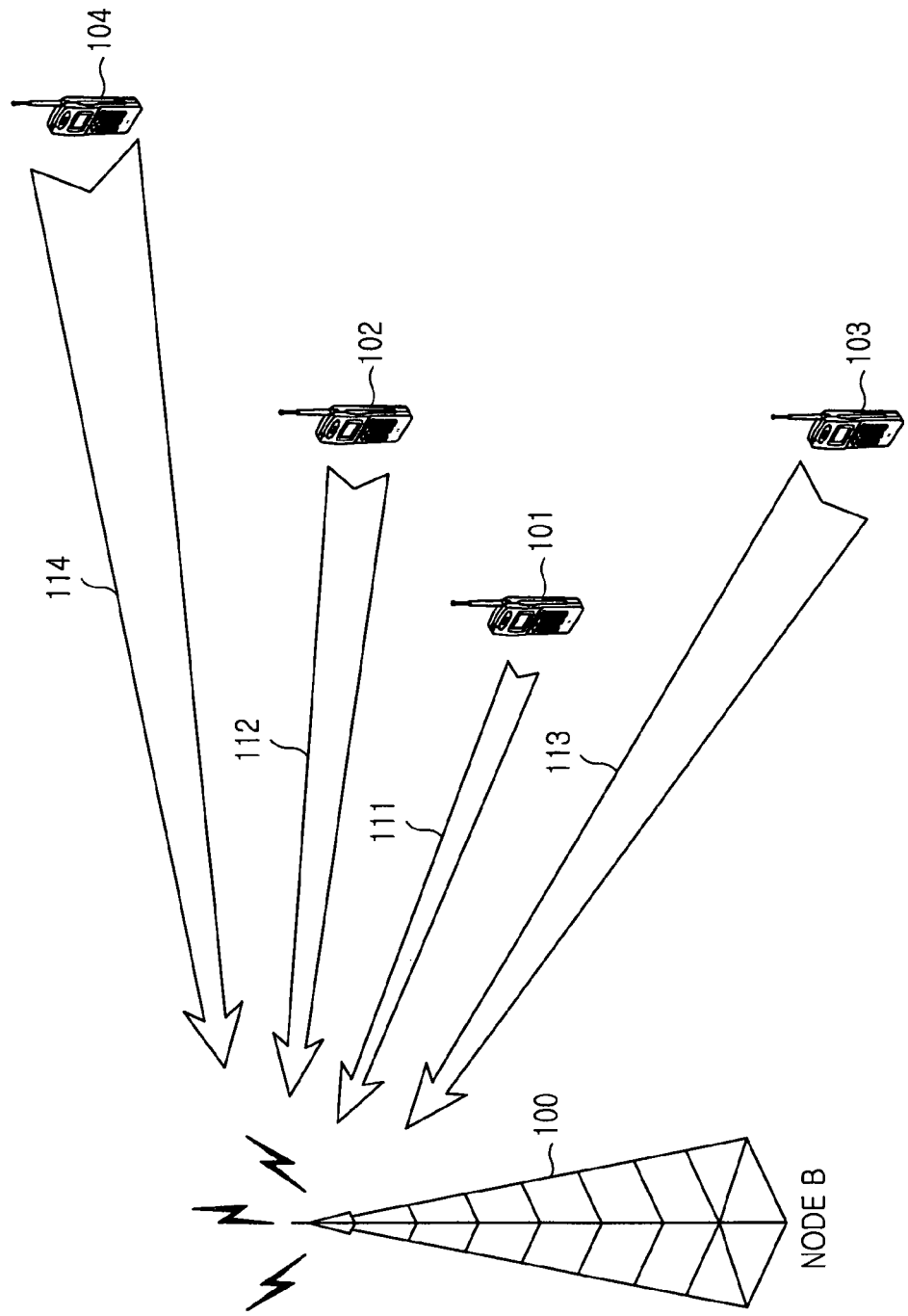
FIG. 3 is a diagram illustrating a conventional method of transmitting data over an E-DCH in a radio uplink.
Figure 4:
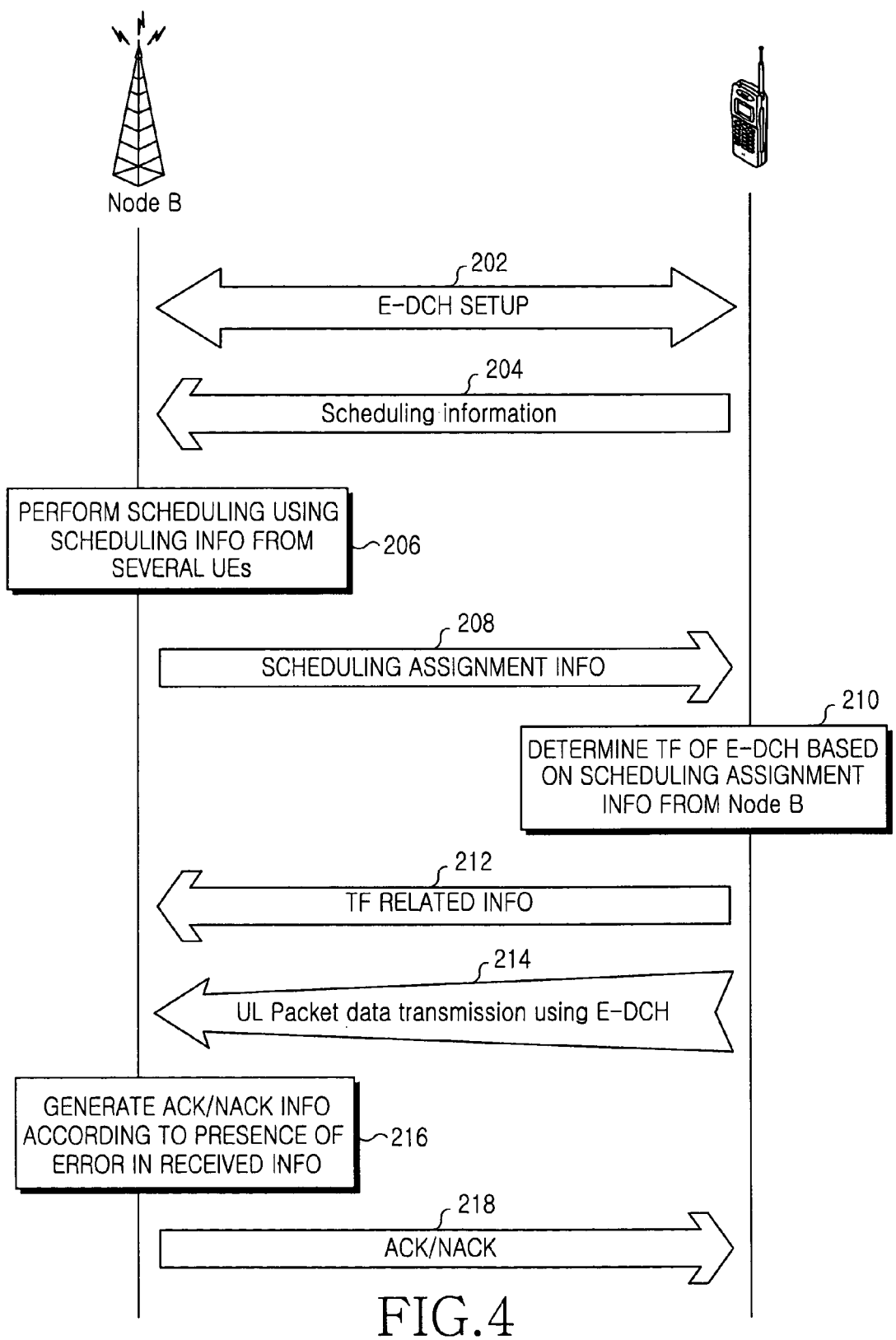
FIG. 4 is a signaling diagram illustrating a conventional procedure for transmitting and receiving messages over an enhanced uplink dedicated channel (E-DCH)
Figure 5:
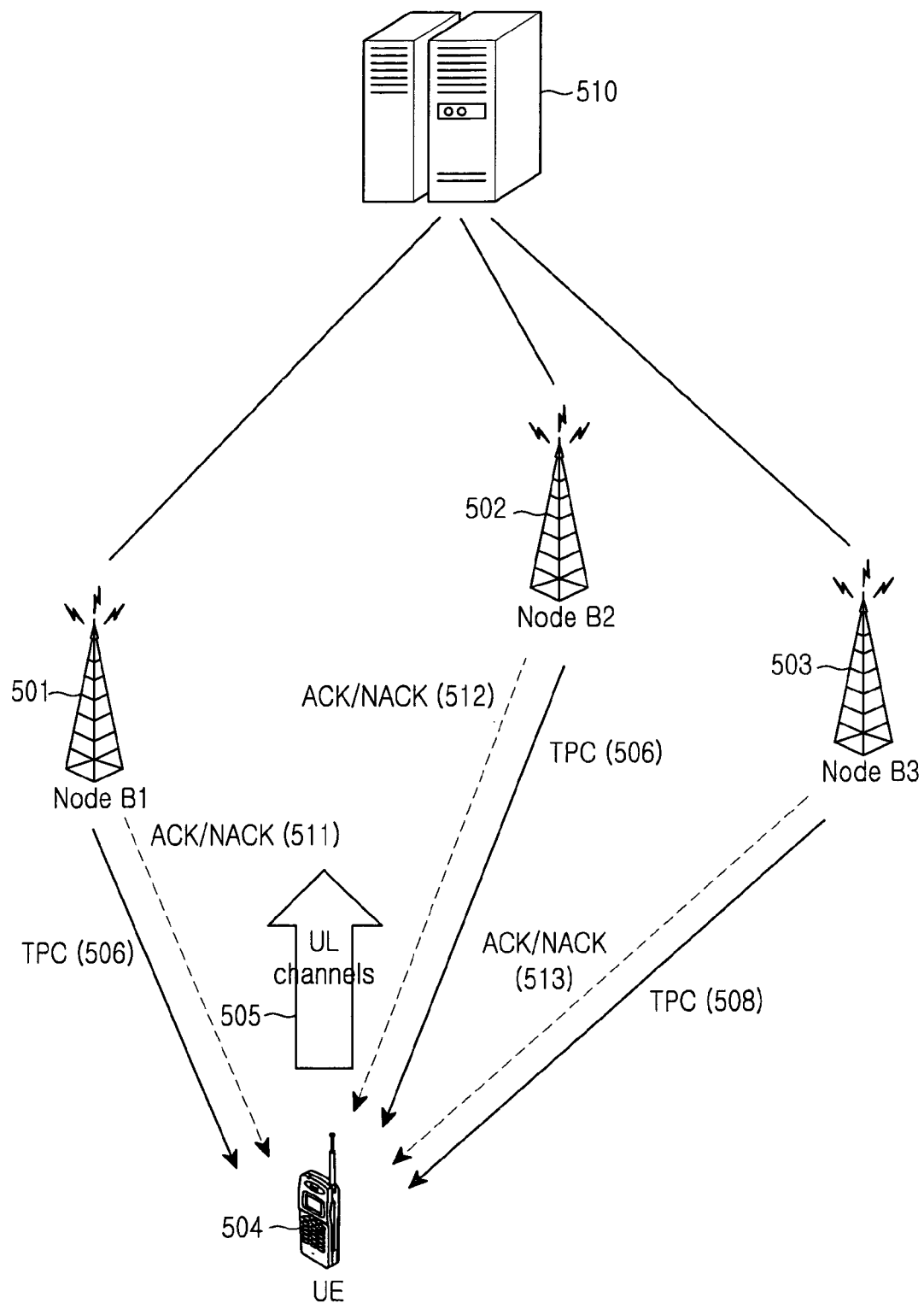
FIG. 5 is a diagram illustrating a conventional operation of supporting soft handover for an E-DCH.
Figure 6:
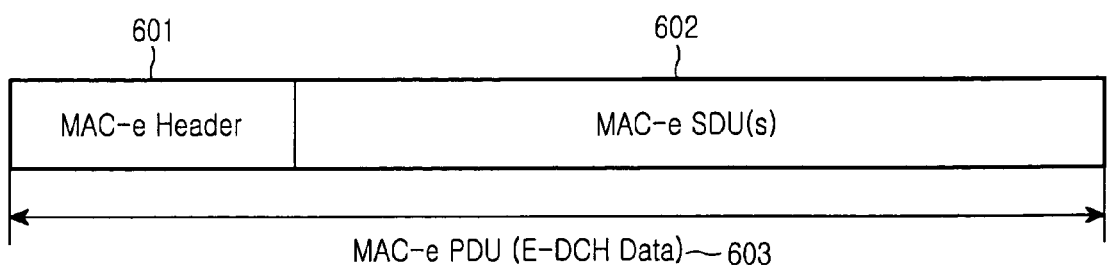
FIG. 6 is a diagram illustrating a structure of an exemplary media access control (MAC)-e packet data unit (PDU) according to an exemplary embodiment of the present invention.

FIG. 6 is a diagram illustrating an exemplary structure of a MAC-e PDU according to an exemplary embodiment of the present invention. Referring to FIG. 6, at least one MAC-e service data unit (SDU) 602 represents a payload of a MAC-e PDU 603, and the MAC-e PDU 603 is created by adding a MAC-e header 601 comprising the information inserted in a MAC-e layer, to the at least one MAC-e SDU 602. The MAC-e PDU 603 is called E-DCH data. In the MAC-e signaling process, UE status information is included in the MAC-e header 601 or the MAC-e SDU 602.

This exemplary embodiment provides a MAC-e signaling method in which a UE located in a soft handover region accurately transmits its UE status information to a serving Node B in the process of transmitting the UE status information to Node Bs.

The UE transmits the UE status information to Node Bs using a signaling method such as an exemplary MAC-e signaling method. In the MAC-e signaling method, the UE status information is included in E-DCH data before being transmitted. If there is no transmission packet data, the E-DCH data can include only the UE status information. Because the E-DCH supports Hybrid Automatic Retransmission Request (HARQ), the E-DCH comprising the UE status information is also accompanied with an HARQ operation. Also, the Node Bs included in an active set of the UE located in a soft handover region independently perform the HARQ operation, and each of the Node Bs checks an error in signaling information such as E-DCH data comprising UE status information (hereinafter referred to as "MAC-e signaling E-DCH data"), and sends an ACK/NACK signal according to the error check result.

In this exemplary embodiment, in a HARQ operation for MAC-e signaling E-DCH data with UE status information, a UE uses only the ACK/NACK signal of the serving Node B as a criterion for determining ACK/NACK. That is, even though a non-serving Node B transmits an ACK as a response to the MAC-e signaling E-DCH data with UE status information, once the serving Node B transmits a NACK, the UE performs retransmission on the MAC-e signaling E-DCH data with UE status information. The HARQ retransmission operation is performed within a predetermined maximum number of retransmissions (hereinafter referred to as a "maximum retransmission number").

Figure 7:
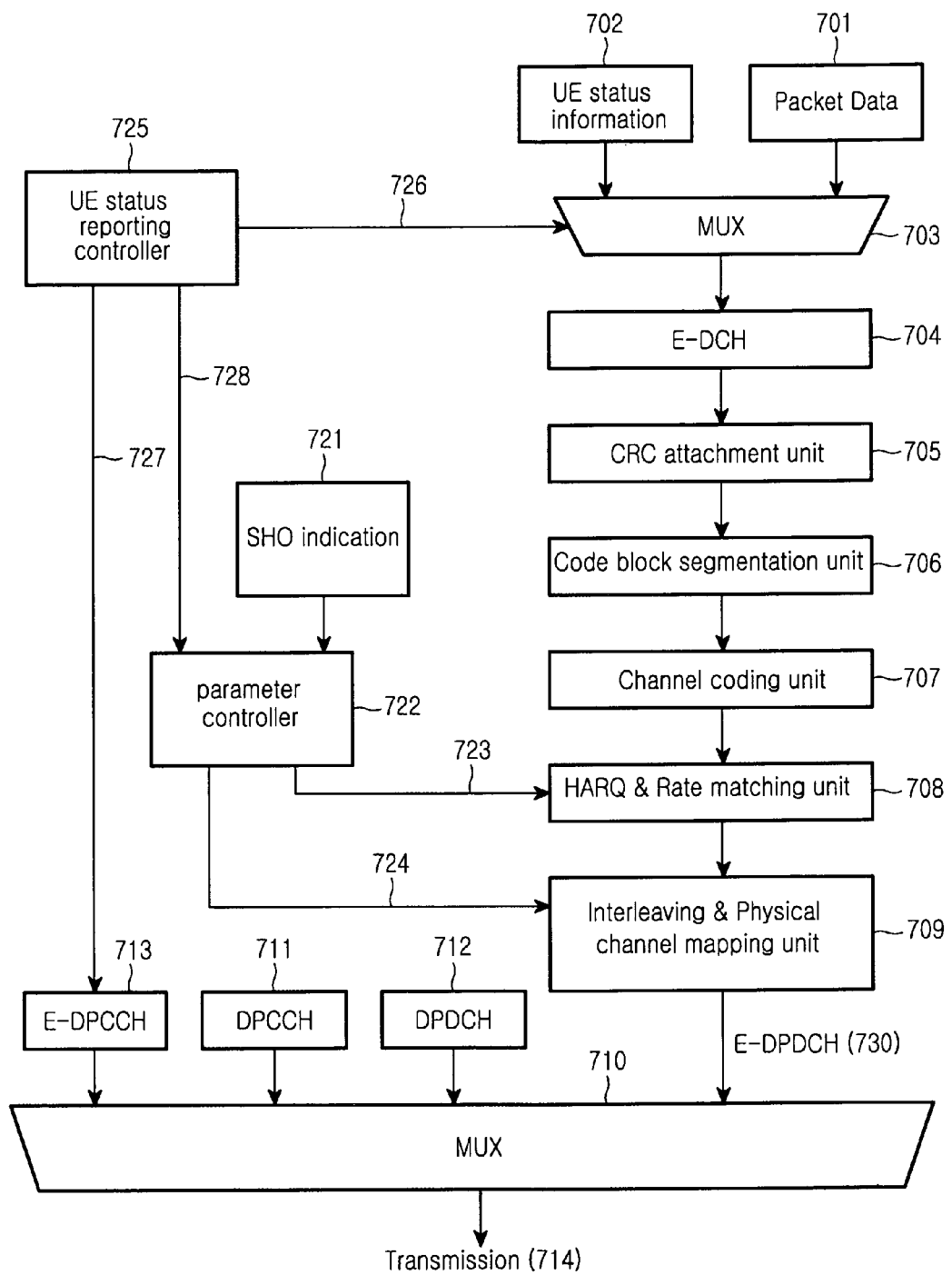
FIG. 7 is a diagram illustrating an exemplary structure of a transmitter for transmitting MAC-e signaling E-DCH data with UE status information according to an exemplary embodiment of the present invention.

With reference to FIG. 7, a description will now be made of an exemplary implementation of an operation of performing a retransmission operation on the MAC-e signaling E-DCH data with UE status information until a serving Node B transmits an ACK signal.

FIG. 7 is a diagram illustrating an exemplary structure of a transmitter for transmitting MAC-e signaling E-DCH data with UE status information according to an exemplary embodiment of the present invention. Referring to FIG. 7, if there is a need to transmit UE status information 702, packet data 701 and the UE status information 702 are multiplexed in a multiplexer (MUX) 703, creating E-DCH data 704. If there is no packet data 701 to transmit, the multiplexer 703 creates the E-DCH data 704 with only the UE status information 702. Determining whether the UE status information 702 is transmitted in the current transmission time interval (TTI) is achieved by a UE status reporting controller 725. The UE status reporting controller 725 controls the multiplexer 703 through a control signal 726, and multiplexes the UE status information 702 and the packet data 701 if there is a need for transmission of the UE status information 702, and otherwise, to output only the packet data 701. If there is no packet data 701 as well, the E-DCH data 704 will not be created. That is, at least one of UE status information and packet data 701 is needed to create E-DCH data 704. A method in which the UE status reporting controller 725 determines whether to transmit the UE status information 702 is divided into a periodic method and an event-triggered method.

The E-DCH data 704 output from the multiplexer 703 is input to a cyclic redundancy code (CRC) attachment unit 705. The CRC attachment unit 705 attaches a CRC to the E-DCH data 704, and outputs the CRC-attached E-DCH data 704 to a code block segmentation unit 706. The code block segmentation unit 706 segments the CRC-attached E-DCH data 704 into code blocks appropriate in size for input information to a channel coding unit 707, and outputs the code blocks to the channel coding unit 707. The channel coding unit 707 channel-codes the code blocks, and outputs the channel-coded information to a HARQ & rate matching unit 708. The HARQ & rate matching unit 708 performs rate matching on the channel-coded information, and outputs the rate-matched information to an interleaving & physical channel mapping unit 709. The interleaving & physical channel mapping unit 709 interleaves the rate-matched information and maps the interleaved information into physical channel data 730 for an enhanced dedicated physical data channel (E-DPDCH). The E-DPDCH data 730 is multiplexed with dedicated physical data channel (DPDCH) data 712, dedicated physical control channel (DPCCH) data 711, and E-DPCCH data 713 for carrying TF-related information of the E-DCH in a multiplexer 710, and then transmitted to a Node B.

The HARQ & rate matching unit 708 determines whether to retransmit the E-DCH data 704 according to response signals received by an undepicted receiver from a serving Node B and a non-serving Node B. In particular, MAC-e signaling E-DCH data with UE status information is retransmitted within the maximum amount of permitted retransmissions until the serving Node B transmits an ACK signal. In this case, it is not possible to obtain macro diversity gain due to soft handover. However, because power control is performed by taking the macro diversity gain into account, there is a need for an additional method for compensating for the intentionally renounced macro diversity gain.

In a first method, the MAC-e signaling E-DCH data with UE status information is greater than general E-DCH data in terms of the HARQ maximum amount of retransmissions used therefor. Herein, the general E-DCH data refers to E-DCH data without MAC-e signaling information. An increase in the HARQ maximum retransmission number increases transmission gain, compensating for the intentionally renounced macro diversity gain.

A control signal 723 exhibits a method for controlling the HARQ maximum amount of retransmissions. A parameter controller 722 provides the control signal 723 indicating the maximum retransmission number to the HARQ & rate matching unit 708 according to a control signal 728 provided from the UE status reporting controller 725 and a soft handover (SHO) indication signal 721. The HARQ & rate matching unit 708 increases the HARQ maximum retransmission number by a predetermined value only when transmitting the MAC-e signaling E-DCH data with UE status information in a soft handover state, and otherwise, uses the exiting HARQ maximum retransmission number value. The HARQ & rate matching unit 708 retransmits packet data upon each receipt of a NACK, and discards the packet data if the number of the retransmissions (hereinafter referred to as a "retransmission number") reaches a value of the control signal 723.

In an exemplary second method, the MAC-e signaling E-DCH data with UE status information is greater than the general E-DCH data in terms of a channel gain used therefor. An increase in the physical channel gain increases transmission gain, compensating for the intentionally renounced macro diversity gain.

A control signal 724 exhibits a method for controlling the physical channel gain. The parameter controller 722 provides the control signal 724 indicating the physical channel gain to the interleaving & physical channel mapping unit 709 according to the control signal 728 provided from the UE status reporting controller 725 and the SHO indication signal 721. The interleaving & physical channel mapping unit 709 increases the channel gain of the E-DPDCH data 730 by a predetermined value only when transmitting the MAC-e signaling E-DCH data with UE status information in a soft handover state, and otherwise, uses the exiting change gain value.

A description has been made of the two exemplary methods of compensating for the intentionally renounced macro diversity gain for the MAC-e signaling E-DCH data with UE status information. Although the two exemplary methods can be individually used, it is shown in FIG. 7 that they are used together. As an increment of the maximum retransmission number and an increment of the channel gain, predetermined values are used or the values determined by analyzing conditions of Node Bs by a Node B or an RNC and then reported to a UE and a serving Node B are used.

The UE status reporting controller 725 determines whether to transmit the UE status information 702 using the periodic method or the event-triggered method. When the UE status information is transmitted on an event-triggered basis, a Node B receiver may have difficulty in determining whether the received E-DCH data is MAC-e signaling E-DCH data with UE status information or general E-DCH data without signaling information. Therefore, when the MAC-e signaling E-DCH data with the UE status information 702 is transmitted, the UE status reporting controller 725 comprises indication information indicating MAC-e signaling E-DCH data in the E-DPCCH data 713 specifying a transport format (TF) of the E-DCH data, and reports the Node B that the MAC-e signaling E-DCH data is transmitted on an event-triggered basis. The UE status reporting controller 725 allows, through a control signal 727, the E-DPCCH data 713 to comprise a TF indicating the presence/absence of MAC-e signaling E-DCH data or comprise a UE status information indicator. By receiving the E-DPCCH data 713, the Node B receiver can correctly determine a type of the E-DCH data, i.e., determine whether the E-DCH data is MAC-e signaling E-DCH data.

Figure 8:
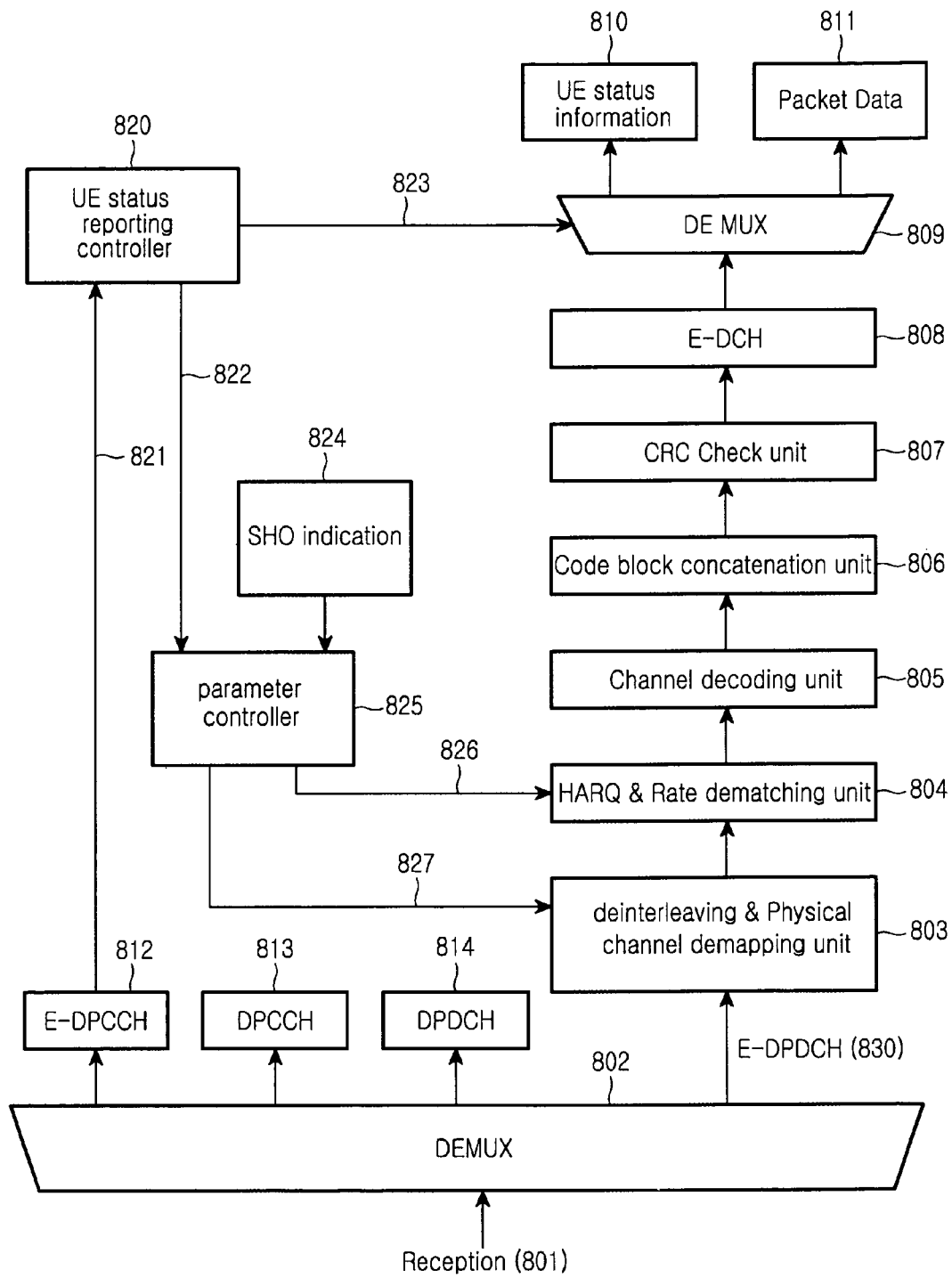
FIG. 8 is a diagram illustrating an exemplary structure of a Node B receiver for receiving MAC-e signaling E-DCH data with UE status information according to an exemplary embodiment of the present invention.

FIG. 8 is a diagram illustrating an exemplary structure of a Node B receiver for receiving MAC-e signaling E-DCH data with UE status information according to an exemplary embodiment of the present invention. Referring to FIG. 8, a signal 801 received from a UE is applied to a demultiplexer (DEMUX) 802. The demultiplexer 802 demultiplexes the received signal 801 into E-DPCCH data 812, DPCCH data 813, DPDCH data 814, and E-DPDCH data 830 with E-DCH data. The Node B should first determine whether the E-DCH data is MAC-e signaling E-DCH data with UE status information or not. If the UE status information is transmitted on a periodic basis, a UE status reporting controller 820 can detect the transmission of the UE status information by calculating the current period. However, if the UE status information is transmitted on an event-triggered basis, the UE status reporting controller 820 can detect the transmission of the UE status information through a TF or a UE status information indicator 821 included in the E-DPCCH data 812. The UE status information indicator 821 is input to the UE status reporting controller 820, and the UE status reporting controller 820 uses the UE status information indicator 821 to indicate whether the E-DCH data is MAC-e signaling E-DCH data with UE status information.

If it is determined that the received E-DCH data is MAC-e signaling E-DCH data with UE status information, the UE status reporting controller 820 controls a demultiplexer 809 using a control signal 823 so as to demultiplex the E-DCH data into UE status information 810 and packet data 811. Otherwise, the UE status reporting controller 820 controls the demultiplexer 809 using the control signal 823 so as to output only the packet data 811.

Because the MAC-e signaling E-DCH data with UE status information is different from the general E-DCH data in either one or both of the HARQ maximum retransmission number and the E-DPDCH channel gain, the receiver should also support them. The UE status reporting controller 820 informs, using a control signal 822, a parameter controller 825 whether the received E-DCH data is MAC-e signaling E-DCH data with UE status information. The parameter controller 825 creates control signals 826 and 827 according to the control signal 822 and an SHO indication signal 824. The control signal 826 is input to an HARQ & rate dematching unit 804, and the HARQ & rate dematching unit 804 designates HARQ maximum retransmission number according to the control signal 826. The control signal 827 is input to a deinterleaving & physical channel demapping unit 803, and the deinterleaving & physical channel demapping unit 803 controls a channel gain of the E-DPDCH data 830 according to the control signal 827.

The E-DPDCH data 830 is input to the deinterleaving & physical channel demapping unit 803, and the deinterleaving & physical channel demapping unit 803 performs physical channel demapping and deinterleaving on the E-DPDCH data 830, and outputs the resultant information to the HARQ & rate dematching unit 804. The HARQ & rate dematching unit 804 performs HARQ processing and rate dematching on the input information, and outputs the resultant information to a channel decoding unit 805. The HARQ & rate dematching unit 804 bypasses the deinterleaved data or combines the deinterleaved data with previously received data according to whether the deinterleaved data is retransmitted data, and thereafter, rate-dematches the data. The channel decoding unit 805 channel-decodes the information rate-dematched by the HARQ & rate dematching unit 804, and outputs the channel-decoded information to a code block concatenation unit 806. The code block concatenation unit 806 concatenates the channel-decoded information, and outputs the concatenated information to a CRC check unit 807. The CRC check unit 807 performs a CRC check on the concatenated information, and outputs the CRC-checked information as E-DCH data 808. The E-DCH data 808 is demultiplexed into the UE status information 810 and the packet data 811 by the demultiplexer 809.

If the MAC-e signaling E-DCH data with UE status information is not periodically transmitted, i.e., if there is a need to transmit the UE status information on an event-triggered basis, the E-DPCCH data 812 comprises a UE status information indicator indicating whether the MAC-e signaling E-DCH data is transmitted. Each of Node Bs can determine whether it is a serving Node B or a non-serving Node B through a soft handover process and a best/non-serving Node B setting process, and detects presence/absence of MAC-e signaling E-DCH data through the UE status information indicator indicating transmission/non-transmission of the MAC-e signaling E-DCH data.

In the process of transmitting the MAC-e signaling E-DCH data with UE status information, the UE located in a soft handover region determines only the ACK/NACK signal from the serving Node B as an effective ACKNACK signal, and disregards the ACKNACK signal from the non-serving Node B. Therefore, the non-serving Node B is not required to transmit the ACK/NACK signal when the MAC-e signaling E-DCH data with only UE status information is received from the UE located in a soft handover region. Accordingly, the non-serving Node B can save downlink transmission power by the transmission power needed for transmission of the ACK/NACK signal.

As described above, the maximum retransmission number or the maximum amount of retransmissions set for transmission of the MAC-e signaling E-DCH data can be equal to or greater than the maximum retransmission number set for transmission of the general E-DCH data. In some cases, however, the MAC-e signaling E-DCH data cannot be successfully received at the serving Node B within the reset maximum retransmission number. In this case, the UE re-includes the UE status information in the next E-DCH data during transmission of the next E-DCH data. That is, if an ACK signal for the MAC-e signaling E-DCH data is not received from the serving Node B until the current retransmission number reaches the reset maximum retransmission number, the UE ends the retransmission of the packet data, and transmits MAC-e signaling E-DCH data comprising a new packet data and the UE status information in the next TTI. After transmitting the next MAC-e signaling E-DCH data, the UE similarly considers only the ACK/NACK signal from the serving Node B.

Figure 9:
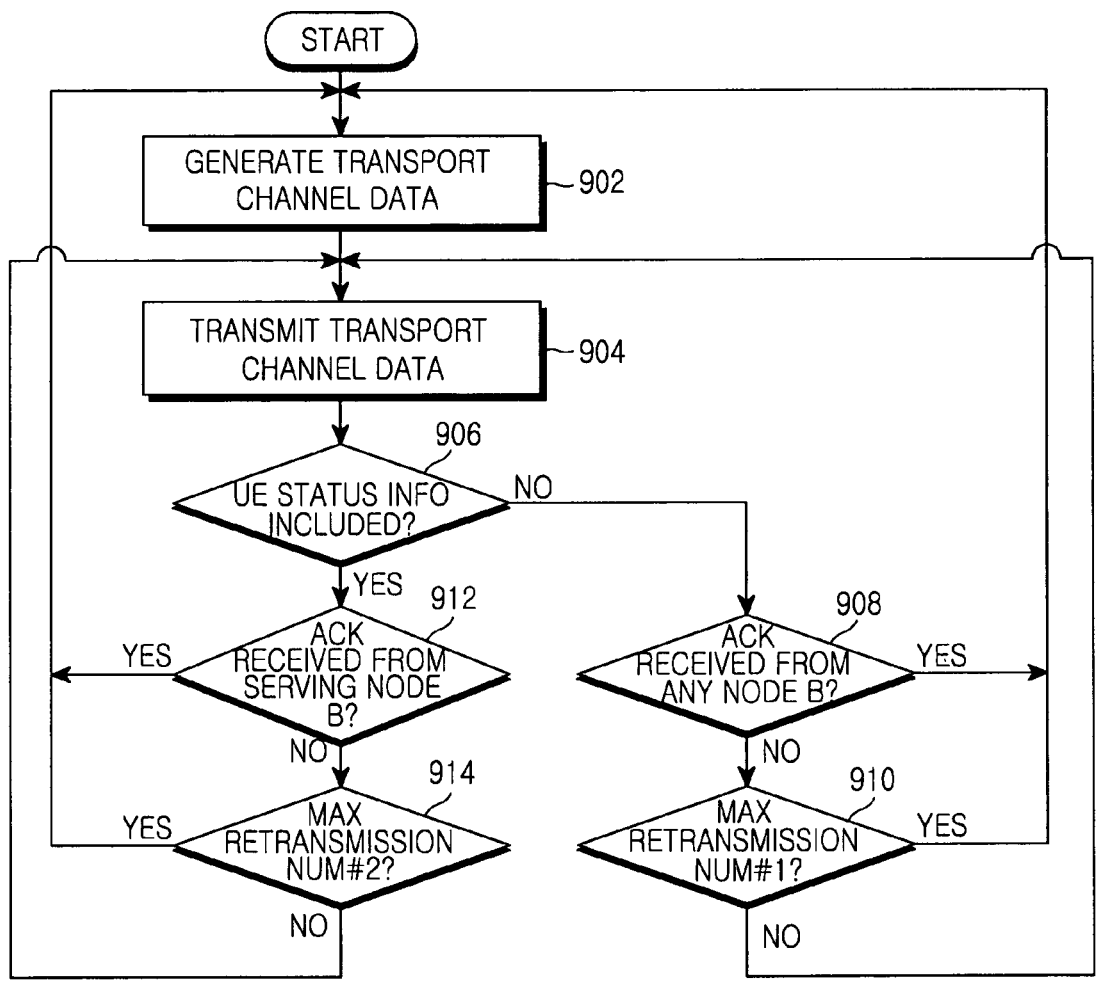
FIG. 9 is a flowchart illustrating an exemplary implementation of an operation of a UE according to an exemplary embodiment of the present invention.

FIG. 9 is a flowchart illustrating an exemplary implementation of an operation of a UE according to an exemplary embodiment of the present invention. Referring to FIG. 9, a UE creates transport channel data, especially, E-DCH data, in step 902, and transmits the E-DCH data after multiplexing it with other transport channel data in step 904. The E-DCH data created in step 902 can comprise UE status information on a periodic basis or on an event-triggered basis. In step 906, the UE determines if the E-DCH data comprises UE status information. If the E-DCH data is the general E-DCH data without UE status information, the UE determines in step 908 whether an ACK signal is received from any one of Node Bs in response to the E-DCH data. If an ACK signal is received from any one of a serving Node B and a non-serving Node B, the UE returns to step 902 to transmit new E-DCH data.

However, if NACK signals are received from all of the Node Bs, the UE determines in step 910 whether a retransmission number of the E-DCH data has reached a first maximum retransmission number. If the retransmission number of the E-DCH data has not reached the first maximum retransmission number, the UE returns to step 904 to retransmit the E-DCH data. However, if the retransmission number has reached the first maximum retransmission number, the UE returns to step 902 to transmit new E-DCH data, abandoning transmission of the E-DCH data.

However, if it is determined in step 906 that the E-DCH data is MAC-e signaling E-DCH data with UE status information, the UE determines in step 912 whether an ACK signal is received from the serving Node B without considering a response signal from the non-serving Node B. If an ACK signal is received from the serving Node B, the UE returns to step 902 to transmit new E-DCH data.

However, if a NACK signal is received from the serving Node B, the UE determines in step 914 whether a retransmission number of the MAC-e signaling E-DCH data has reached a second maximum retransmission number which is set greater than the first maximum retransmission number. If the retransmission number of the MAC-e signaling E-DCH data has not reached the second maximum retransmission number, the UE returns to step 904 to retransmit the MAC-e signaling E-DCH data. However, if the retransmission number of the MAC-e signaling E-DCH data has reached the second maximum retransmission number, the UE returns to step 902 to transmit new E-DCH data, abandoning transmission of the E-DCH data.

Another exemplary embodiment of the present invention provides a method for signaling UE status information through a physical control channel by a UE located in a soft handover region. The UE can use 2 E-DCH-related dedicated physical channels, i.e., an E-DPCCH1 and an E-DPCCH2. The E-DPCCH1 specifies a TF of E-DCH data being transmitted, and the E-DPCCH2 carries the UE status information independently of the E-DCH data.

A description will now be made of data transmission using the E-DPCCH1 and the E-DPCCH2. Both of the information specifying a TF of E-DCH data and the UE status information can be transmitted through an E-DPDCH or an E-DPCCH. Therefore, an exemplary embodiment of the present invention can be applied to all of the cases where UE status information is signaled through a physical channel.

In the case where power control is performed in a soft handover region by combining transmit power control commands (TPCs) received from several Node Bs using an OR-of-DOWN method, transmission power of the E-DPCCH1 or the E-DPCCH2 can be insufficient, so that the serving Node B may not correctly receive the UE status information. Therefore, this exemplary embodiment provides a method of compensating for the lack of the transmission power of the E-DPCCH2.

A UE located in a soft handover region transmits the E-DPCCH2 using transmission power determined by adding a power offset value to transmission power of the E-DPCCH1 in a known power control method. That is, the transmission power of the E-DPCCH2 is higher than the transmission power of the E-DPCCH1 by the power offset value.

Upon entering the soft handover region, the UE determines transmission power for the E-DPCCH2 by adding the power control offset value to the transmission power of the E-DPCH1. As the power offset value, a predetermined value is used or the value determined by a Node B or an RNC and then reported to the UE and the Node B is used.

Alternatively, a power offset value adaptively determined within a predetermined range can be used. That is, the UE defines a limit of a power offset value, and determines the power offset value within the limit using a difference between a TPC provided from a serving Node B and a combined TPC determined by the OR-of-DOWN method. If there is a difference between the TPC from the serving Node B and the combined TPC, the UE increases the power offset value of the E-DPCCH2 from the value used in the previous slot by, for example, 2 dB, and if there is no difference therebetween, the UE uses the intact power offset value used in the previous slot.

If the TPC from the serving Node B is an UP command and the combined TPC is a DOWN command, the UE increases the power offset value. Similarly, the power offset value cannot exceed a predetermined limit. If the power offset value reaches the limit, the UE maintains the power offset value at the limit even though the TPC from the serving Node B is an UP command and the combined TPC is a DOWN command. At this time, if the TPC from the serving Node B becomes a DOWN command, the power offset value is initialized to 0 dB.

Figure 10:
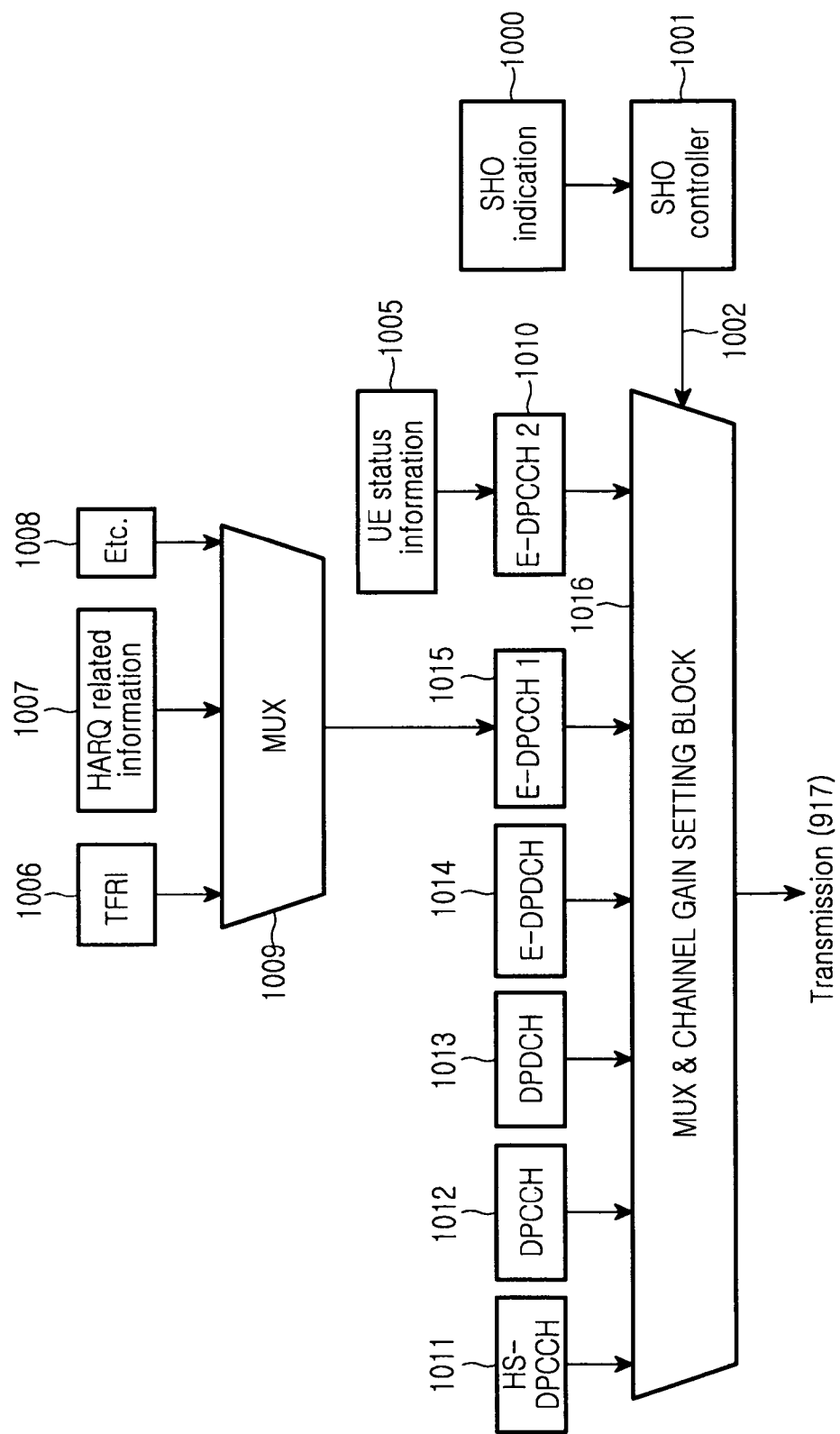
FIG. 10 is a diagram illustrating an exemplary structure of a UE transmitter according to an exemplary embodiment of the present invention.

FIG. 10 is a diagram illustrating an exemplary structure of a UE transmitter according to an exemplary embodiment of the present invention. Referring to FIG. 10, UE status information 1005 is comprised of E-DPCCH2 data 1010. E-DPCCH1 data 1015 specifying a TF of E-DCH data is created by a multiplexer 1009 by multiplexing a transport format resource indicator (TFRI) 1006 indicating a transport block format of the E-DCH data, HARQ-related information 1007 indicating whether to retransmit the E-DCH data, and the other information 1008. The E-DPCCH1 data 1015 and the E-DPCCH2 data 1010, together with DPDCH data 1013, DPCCH data 1012, HS-DPCCH (DPCCH for high speed data packet access (HSDPA)) data 1011, and E-DPDCH data 1014 comprising E-DCH data, are multiplied by corresponding channel gains, and then time-multiplexed or code-multiplexed in a MUX & channel gain setting block 1016. The MUX & channel gain setting block 1016 time-multiplexes only the E-DPCCH1 data 1015 and the E-DPCCH2 data 1010, and code-multiplexes the other channel data 1011 through 1014. A channel gain of the E-DPCCH2 data 1010 is determined by adding a predetermined power offset value to a channel gain of the E-DPCCH1 data 1015. The multiplexed data is transmitted on a transmission signal 1017.

The MUX & channel gain setting block 1016 is controlled according to a control signal 1002 that is generated by a SHO controller 1001 depending on a SHO indication signal 1000. If the SHO indication signal 1000 indicates a SHO region, the SHO controller 1001 sets a power offset value of the E-DPCCH2 data 1010 in the MUX & channel gain setting block 1016 using the control signal 1002. The power offset value, as described above, can be a predetermined value, a value given by a Node B, or an adaptively variable value.

Figure 11:
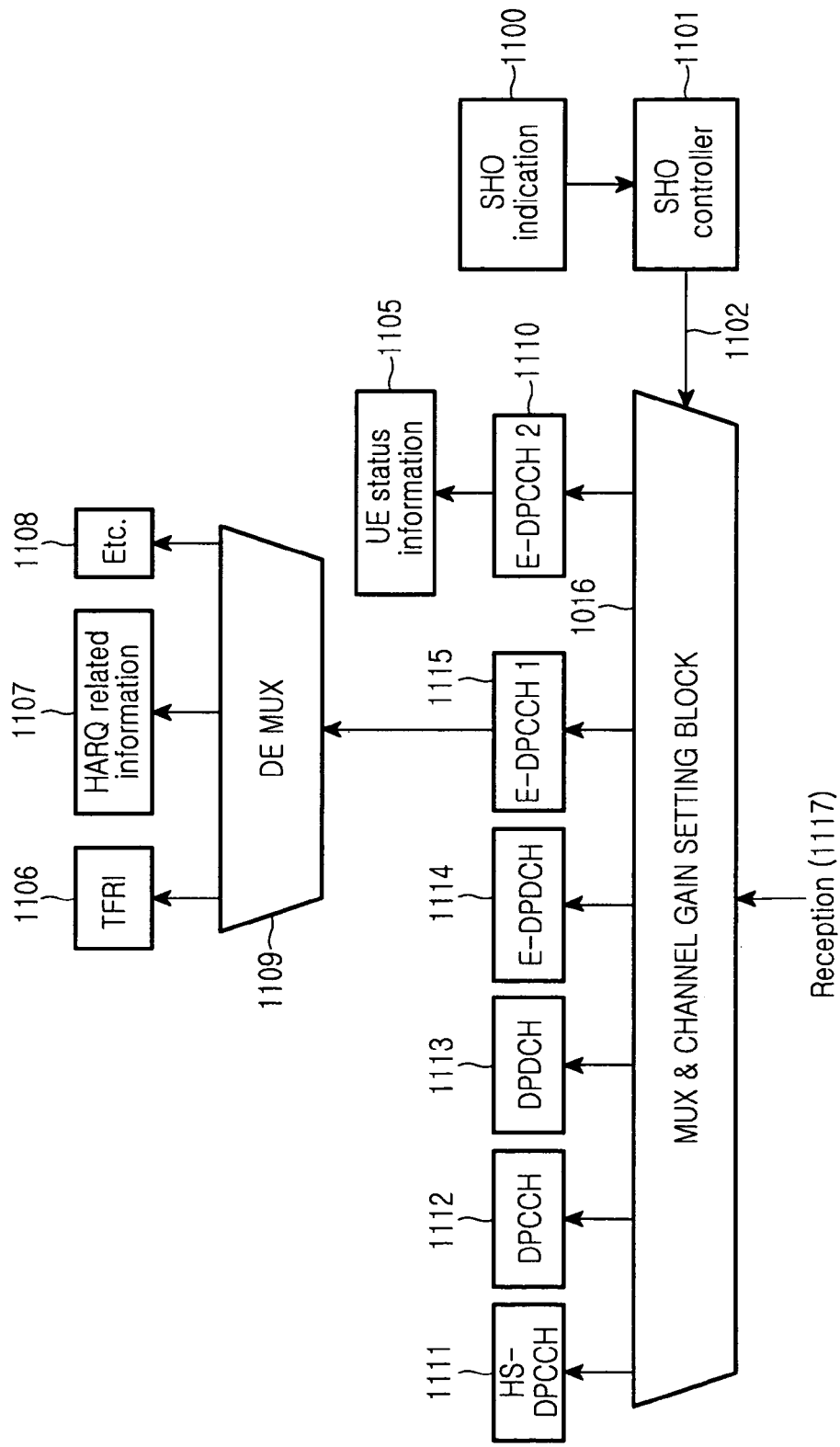
FIG. 11 is a diagram illustrating an exemplary structure of a Node B receiver according to an exemplary embodiment of the present invention.

FIG. 11 is a diagram illustrating an exemplary structure of a Node B receiver according to an exemplary embodiment of the present invention.

Referring to FIG. 11, a Node B receiver demultiplexes a signal 1117 received from a UE into a variety of channel data at a demultiplexer 1116. The demultiplexer 1116 outputs HS-DPCCH data 1111, DPCCH data 1112, DPDCH data 1113, E-DPDCH data 1114 with E-DCH data, E-DPCCH1 data 1115, and E-DPCCH2 data 1110. In the process of receiving the E-DPCCH2 data 1110, the transmission power offset value set in the UE transmitter of FIG. 10 is required by the demultiplexer 1116 for interference cancellation and reception power measurement. Because the E-DPCCH2 data 1110 is received only in the soft handover region, a SHO controller 1101 detects a soft handover state of the UE using the SHO indication signal 1100, and informs the demultiplexer 1116 of the soft handover state using a control signal 1102. If the control signal 1102 indicates the soft handover state, the demultiplexer 1116 performs demultiplexing on the E-DPCCH2 data 1110 using the power offset value. The power offset value can be a predetermined value, or a value determined by a Node B or an RNC.

A demultiplexer 1109 demultiplexes the E-DPCCH1 data 1115 to extract a TFRI 1106, HARQ-related information 1107, and the other information 1108. The Node B receiver detects UE status information 1105 by receiving the E-DPCCH2 data 1110, and schedules a data rate of the UE according to the UE status information 1105.

In another exemplary embodiment, a UE located in a soft handover region transmits UE status information with physical channel signaling using an E-DPCCH2, wherein E-DPCCH2 data comprising the UE status information is repeatedly transmitted. In this exemplary embodiment, the UE can use two dedicated physical channels of an E-DPCCH1 and an E-DPCCH2. The E-DPCCH1 specifies a TF of the E-DCH data being transmitted, and the E-DPCCH2 carries the UE status information independently of the E-DCH data.

A description will now be made of data transmission using the E-DPCCH1 and the E-DPCCH2. Both of the information specifying a TF of E-DCH data and the UE status information can be transmitted through an E-DPDCH or an E-DPCCH. Therefore, this exemplary embodiment of the present invention can be applied to all of the cases where E-DCH data with UE status information is signaled through a physical channel.

In the case where power control is performed in a soft handover region by combining TPCs received from several Node Bs using the OR-of-DOWN method, transmission power of the E-DPCCH1 or the E-DPCCH2 can be insufficient, so that the serving Node B may not correctly receive the UE status information. Therefore, this exemplary embodiment compensates for the lack of the transmission power of the E-DPCCH2 through retransmission.

To compensate for the lack of the transmission power of the E-DPCCH2, the UE repeatedly transmits E-DPCCH2 data two or more times upon entering a soft handover region, thereby obtaining time diversity gain. For a value of the number of repetitions (hereinafter referred to as a "repetition number") for the E-DPCCH2, a predetermined value is used or the value determined by a Node B or a RNC and then reported to the UE and the Node B is used.

An exemplary structure of a UE transmitter according to this exemplary embodiment will be now described with reference to FIG. 10. Referring to FIG. 10, UE status information 1005 is comprised of E-DPCCH2 data 1010. E-DPCCH1 data 1015 specifying a TF of E-DCH data is created by a multiplexer 1009 by multiplexing a TFRI 1006 indicating a transport block format of the E-DCH data, HARQ-related information 1007 indicating whether to retransmit the E-DCH data, and the other information 1008. The E-DPCCH1 data 1015 and the E-DPCCH2 data 1010, together with DPDCH data 1013, DPCCH data 1012, HS-DPCCH data 1011, and E-DPDCH data 1014 comprising E-DCH data, are multiplied by corresponding channel gains, and then time-multiplexed or code-multiplexed in a MUX & channel gain setting block 1016.

The MUX & channel gain setting block 1016 is controlled according to a control signal 1002 that is generated by an SHO controller 1001 depending on an SHO indication signal 1000. If the SHO indication signal 1000 indicates a SHO region, the SHO controller 1001 controls a repetition number for the E-DPCCH2 data 1010 in the MUX & channel gain setting block 1016 using the control signal 1002. Then the MUX & channel gain setting block 1016 repeatedly transmits the E-DPCCH2 data 1010 by time multiplexing. As described above, for a value of the repetition number for the E-DPCCH2, a predetermined value is used or a value given by a Node B is used.

An exemplary structure of a Node B receiver according to this exemplary embodiment of the present invention will now be described with reference to FIG. 11. Referring to FIG. 11, a Node B receiver demultiplexes a signal 1117 received from a UE into a variety of channel data at a demultiplexer 1116. The demultiplexer 1116 outputs HS-DPCCH data 1111, DPCCH data 1112, DPDCH data 1113, E-DPDCH data 1114 with E-DCH data, E-DPCCH1 data 1115, and E-DPCCH2 data 1110. The E-DPCCH2 data 1110 can be repeatedly transmitted from a UE transmitter, and the repeated transmission is performed only when the UE is located in a soft handover region. Therefore, a SHO controller 1101 controls a demultiplexer 1116 using a control signal 1102 that is generated depending on a SHO indication signal 1100.

If the control signal 1102 indicates the soft handover region, the demultiplexer 1116 combines the repeatedly received E-DPCCH2 data 1110 using, for example, a maximum ratio combing method. As a value of the repetition number for the E-DPCCH2, a predetermined value is used or the value determined by a Node B or an RNC is used. The UE transmitter and the Node B receiver share the same repetition number value.

Another exemplary embodiment provides a method in which a UE located in a soft handover region accurately transmits UE status information to a serving Node B in the process of transmitting the UE status information to a Node B with a MAC-e signaling method.

The UE transmits its UE status information to Node Bs with the MAC-e signaling method. In the MAC-e signaling method, the UE status information is included in E-DCH data together with packet data before being transmitted. Because the E-DCH is a channel supporting HARQ, the UE status information transmitted through the E-DCH also accompanies an HARQ operation. Also, a UE located in the soft handover region and Node Bs included in an active set of the UE perform the HARQ operation, and each of the Node Bs checks an error in E-DCH data, especially, MAC-e signaling E-DCH data, and sends an ACK/NACK signal according to the error check result.

If any one of the ACK/NACK signals received from the Node Bs is an ACK signal, the UE no longer performs retransmission on the MAC-e signaling E-DCH data corresponding to the ACK signal. Here, if the ACK signal was received from a non-serving Node B and a serving Node B transmitted a NACK signal, the serving Node B cannot detect UE status information included in the MAC-e signaling E-DCH data. Therefore, in this exemplary embodiment, the UE repeatedly transmits the UE status information until the serving Node B receives the UE status information. A detailed process thereof will be described herein below.

The UE transmits UE status information through MAC-e signaling E-DCH data. If a HARQ operation of the MAC-e signaling E-DCH data is ended as a serving Node B transmits a NACK signal in response to the MAC-e signaling E-DCH data and a non-serving Node B transmits an ACK signal, the serving Node B fails to receive the UE status information.

In a normal case, UE status information is generated on a periodic basis or an event-triggered basis and then transmitted on E-DCH data with the MAC-e signaling method only for a corresponding period. However, if the HARQ process ends before the serving Node B receives the UE status information as described above, the UE retransmits the next packet data and the UE status information using the MAC-e signaling method even in the process of transmitting E-DCH data in the next period. The retransmitted UE status information can be one of the previously transmitted UE status information and newly measured UE status information. Even though the UE has transmitted the UE status information using the MAC-e signaling method, if the HARQ process is ended not in response to an ACK signal from the serving Node B, the UE repeatedly transmits the UE status information by MAC-e signaling every TTI.

In this manner, the UE continuously transmits the UE status information by MAC-e signaling, and stops transmission of the UE status information at the time when the serving Node B transmits an ACK signal. That is, the moment that the serving Node B transmits an ACK signal, the UE can perceive that the serving Node B has received the UE status information. Then there is no need to retransmit the UE status information, and the UE transmits E-DCH data comprising the packet data without the UE status information until the next time when UE status information should be transmitted on a periodic basis or on an event-triggered basis.

In this exemplary embodiment, the HARQ operation of the UE is constant regardless of the MAC-e signaling method for transmitting the UE status information, and only the operation of creating a MAC-e PDU in a MAC-e layer is changed.

Figure 12:
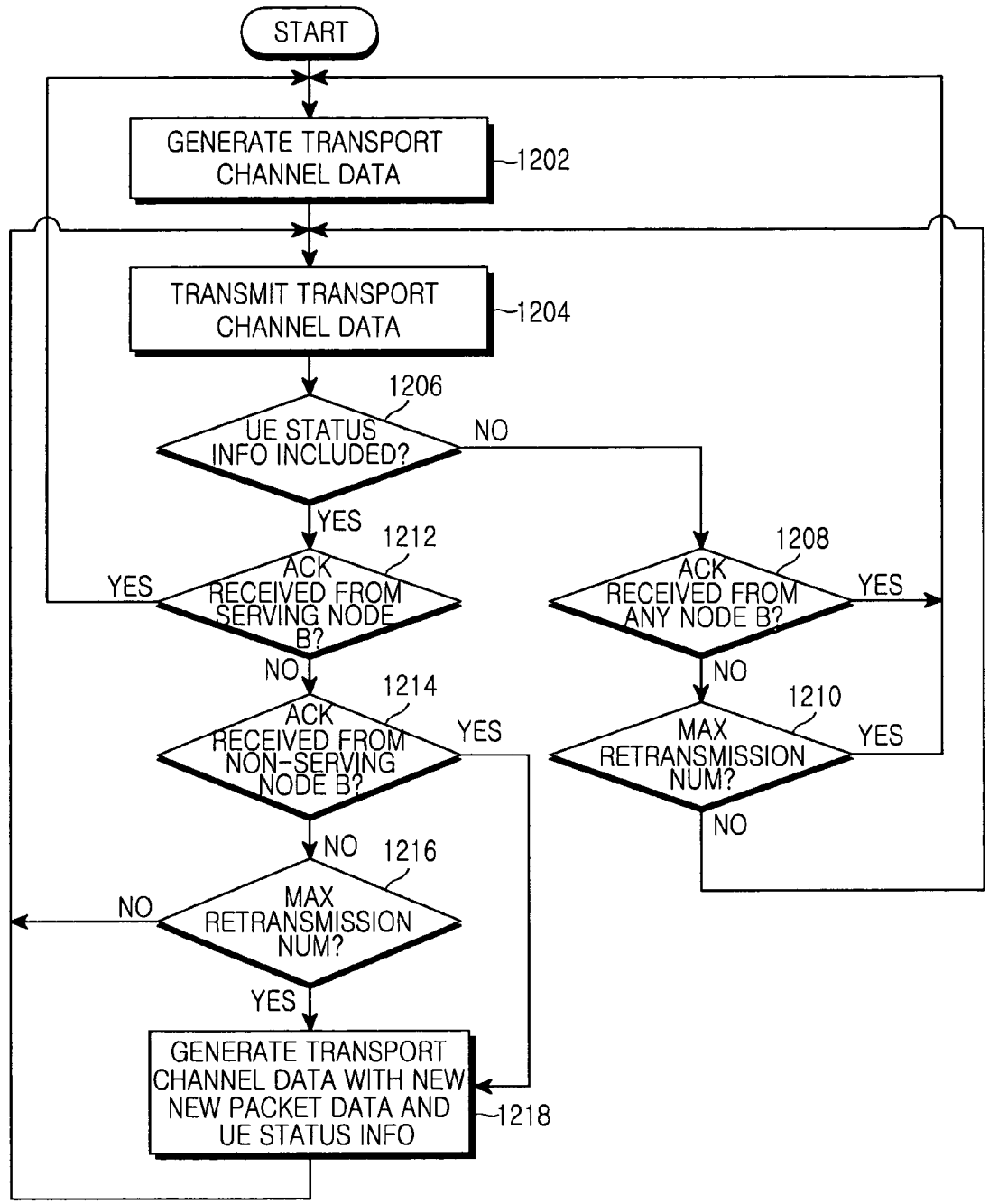
FIG. 12 is a flowchart illustrating an exemplary implementation of an operation of a UE according to an exemplary embodiment of the present invention.

FIG. 12 is a flowchart illustrating an exemplary implementation of an operation of a UE according to an exemplary embodiment of the present invention. Referring to FIG. 12, a UE creates transport channel data, especially, E-DCH data, in step 1202, and transmits the E-DCH data after multiplexing it with other transport channel data in step 1204. The E-DCH data created in step 1202 can comprise UE status information on a periodic basis or on an event-triggered basis. In step 1206, the UE determines if the E-DCH data comprises UE status information. If the E-DCH data is the general E-DCH data without UE status information, the UE determines in step 1208 whether an ACK signal is received from any one of Node Bs in response to the E-DCH data. If an ACK signal is received from any one of a serving Node B and a non-serving Node B, the UE returns to step 1202 to transmit new E-DCH data.

However, if NACK signals are received from all of the Node Bs, the UE determines in step 1210 whether a retransmission number of the E-DCH data has reached a predetermined maximum retransmission number. If the retransmission number of the E-DCH data has not reached the maximum retransmission number, the UE returns to step 1204 to retransmit the E-DCH data. However, if the retransmission number has reached the maximum retransmission number, the UE returns to step 1202 to transmit new E-DCH data, abandoning transmission of the E-DCH data.

However, if it is determined in step 1206 that the E-DCH data is MAC-e signaling E-DCH data comprising both the UE status information and the packet data, the UE determines in step 1212 whether an ACK signal is received from the serving Node B. If an ACK signal is received from the serving Node B, the UE returns to step 1202 to transmit new E-DCH data.

However, if a NACK signal is received from the serving Node B, the UE determines in step 1214 whether an ACK signal is received from any one of non-serving Node Bs. If an ACK signal is received from any non-serving Node B, the UE creates new E-DCH data comprising new packet data and UE status information in step 1218, determining that the packet data included in the MAC-e signaling E-DCH data will be transmitted to the RNC through the non-serving Node B, and then returns to step 1204 to transmit the new E-DCH data.

However, if it is determined in step 1214 that NACK signals are received from all of the Node Bs, the UE determines in step 1216 whether a retransmission number of the MAC-e signaling E-DCH data has reached the maximum retransmission number. If the retransmission number of the MAC-e signaling E-DCH data has not reached the maximum retransmission number, the UE returns to step 1204 to retransmit the full MAC-e signaling E-DCH data. However, if the retransmission number of the MAC-e signaling E-DCH data has reached the maximum retransmission number, the UE proceeds to step 1218 to transmit new E-DCH data, abandoning transmission of the packet data included in the MAC-e signaling E-DCH data.

As can be understood from the foregoing description, the novel method can efficiently schedule a UE located in a soft handover region in the process of performing scheduling for uplink packet transmission in a WCDMA communication system. The UE located in a soft handover region correctly and reliably reports its UE status information to a serving Node B having higher scheduling authority, thereby contributing to an increase in scheduling performance and the entire system stability.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A signaling method for transmitting scheduling information for scheduling by a user equipment, UE in communication with a serving Node B and at least one non-serving Node B in a mobile communication system supporting an uplink packet data service, wherein the scheduling information for scheduling is contained in a MAC-e packet data unit, PDU, the method comprising the steps of:
   generating the MAC-e PDU containing the scheduling information for scheduling;
   transmitting the MAC-e PDU to the serving Node B and the at least one non-serving Node B; and
   performing an Hybrid Automatic Retransmission Request, HARQ, operation for retransmitting the MAC-e PDU containing the scheduling information until an acknowledge, ACK, signal for the MAC-e PDU is received from the serving Node B with regardless of receiving an ACK signal from the at least one non-serving Node B,
   wherein the scheduling information for scheduling is transmitted without transmission packet data.

2. The signaling method of claim 1, wherein the scheduling information is inserted in a payload of the MAC-e PDU.

3. The signaling method of claim 1, further comprising the step of:
   performing the HARQ operation within a predetermined maximum number of retransmissions.

4. A signaling method of claim 1, wherein the scheduling information comprises at least one of buffer status information, uplink transmission power information and information indicating available power.

5. A signaling method for transmitting scheduling information for scheduling by a user equipment, UE in communication with a serving Node B and at least one non-serving Node B in a mobile communication system supporting an uplink packet data service, wherein the scheduling information for scheduling is contained in a MAC-e packet data unit, PDU, the method comprising the steps of:
   generating the MAC-e PDU containing the scheduling information for scheduling;
   transmitting the MAC-e PDU to the serving Node B and the at least one non-serving Node B;
   performing an Hybrid Automatic Retransmission Request, HARQ, operation for retransmitting the MAC-e PDU containing the scheduling information for scheduling until an acknowledge, ACK, signal for the MAC-e PDU is received from the serving Node B or the at least one non-serving Node B,
   wherein the scheduling information for scheduling is transmitted together with transmission packet data; and
   transmitting the scheduling information and a new transmission packet data in the next period if an ACK signal is received from any one of non-serving Node Bs.

6. The signaling method of claim 5, wherein the scheduling information is inserted in a payload of the MAC-e PDU.

7. The signaling method of claim 5, further comprising the step of:
   performing the HARQ operation within a predetermined maximum number of retransmissions.

8. A signaling method of claim 5, wherein the scheduling information comprises at least one of buffer status information, uplink transmission power information and information indicating available power.

9. A user equipment, UE, apparatus for scheduling by a UE in communication with a serving Node B and at least one non-serving Node B in a mobile communication system supporting an uplink packet data service, wherein the scheduling information for scheduling is contained in a MAC-e packet data unit, PDU, the apparatus comprising:
   means for generating the MAC-e PDU containing the scheduling information for scheduling;
   means for transmitting the MAC-e PDU to the serving Node B and the at least one non-serving Node B;
   means for receiving a response signal for the MAC-e PDU from to the serving Node B and the at least one non-serving Node B; and
   means for controlling performing an Hybrid Automatic Retransmission Request, HARQ, operation for retransmitting the MAC-e PDU containing the scheduling information until an acknowledge, ACK, signal in response to the MAC-e PDU is received from the serving Node B with regardless of receiving an ACK signal from the at least one non-serving Node B, wherein the scheduling information for scheduling is transmitted without transmission packet data.

10. The UE apparatus of claim 9, wherein the means for generating the MAC-e PDU is further configured to insert the scheduling information in a payload of the MAC-e PDU.

11. The UE apparatus of claim 9, wherein the HARQ operation is performed within a predetermined maximum number of retransmissions.

12. A user equipment (UE) apparatus of claim 9, wherein the scheduling information comprises at least one of buffer status information, uplink transmission power information and information indicating available power.

13. A user equipment, UE, apparatus for scheduling by a UE in communication with a serving Node B and at least one non-serving Node B in a mobile communication system supporting an uplink packet data service, wherein the scheduling information for scheduling is contained in a MAC-e packet data unit, PDU, the apparatus comprising:
   means for generating the MAC-e PDU containing the scheduling information for scheduling;
   means for transmitting the MAC-e PDU to the serving Node B and the at least one non-serving Node B;
   means for receiving a response signal for the MAC-e PDU from to the serving Node B and the at least one non-serving Node B; and
   means for controlling performing an Hybrid Automatic Retransmission Request, HARQ, operation for retransmitting the MAC-e PDU containing the scheduling information for scheduling until an acknowledge, ACK, signal for the MAC-e PDU is received from the serving Node B or the at least one non-serving Node B, wherein the scheduling information for scheduling is transmitted together with transmission packet data, and controlling the means for transmitting the MAC-e PDU and the means for generating the MAC-e PDU in order to transmit the scheduling information and a new transmission packet data in the next period if an ACK signal is received from any one of non-serving Node Bs.

14. The UE apparatus of claim 13, wherein the means for generating the MAC-e PDU is further configured to insert the scheduling information in a payload of the MAC-e PDU.

15. The UE apparatus of claim 13, wherein the HARQ operation is performed within a predetermined maximum number of retransmissions.

16. A user equipment (UE) apparatus of claim 13, wherein the scheduling information comprises at least one of buffer status information, uplink transmission power information and information indicating available power.

* * * * *